No. 814,057. PATENTED MAR. 6, 1906.
J. G. LEWIS & C. W. BAGLEY.
WORK HOLDING DEVICE FOR SEWING MACHINES.
APPLICATION FILED MAR. 19, 1904.

2 SHEETS—SHEET 1.

Witnesses
W. A. Alexander
Fred Henkel

Inventors
John G. Lewis
Chas. W. Bagley
By Attorneys
Fowler & Bryson

No. 814,057.                              PATENTED MAR. 6, 1906.
J. G. LEWIS & C. W. BAGLEY.
WORK HOLDING DEVICE FOR SEWING MACHINES.
APPLICATION FILED MAR. 19, 1904.
2 SHEETS—SHEET 2.
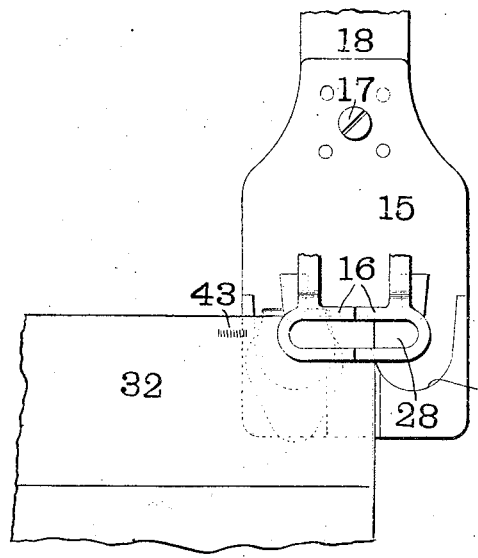
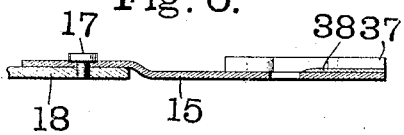
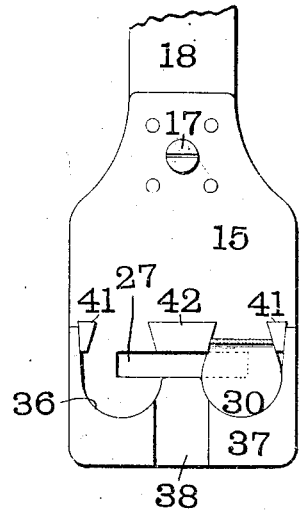
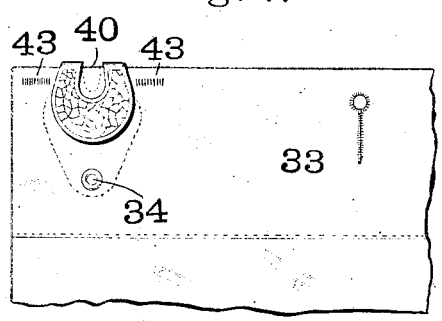
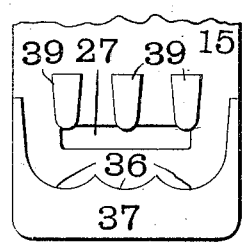
Witnesses
W. A. Alexander
Fred Henke
Inventors
John G. Lewis
Chas. W Bagley
By Attorneys
Fowler & Bryson

UNITED STATES PATENT OFFICE.

JOHN G. LEWIS AND CHARLES W. BAGLEY, OF ST. LOUIS, MISSOURI, ASSIGNORS, BY DIRECT AND MESNE ASSIGNMENTS, TO LEWIS BLIND STITCH MACHINE COMPANY, OF ST. LOUIS, MISSOURI, A CORPORATION OF MISSOURI.

WORK-HOLDING DEVICE FOR SEWING-MACHINES.

No. 814,057.   Specification of Letters Patent.   Patented March 6, 1906.

Application filed March 19, 1904. Serial No. 198,958.

*To all whom it may concern:*

Be it known that we, JOHN G. LEWIS and CHARLES W. BAGLEY, citizens of the United States, residing at the city of St. Louis, in the State of Missouri, have invented a certain new and useful Improvement in Work-Holding Devices for Sewing-Machines, of which the following is such a full, clear, and exact description as will enable any one skilled in the art to which it appertains to make and use the same, reference being had to the accompanying drawings, forming part of this specification.

Our invention relates to sewing-machines, and more particularly to an arrangement of the cloth-holding device of a barring or tacking machine, by means of which a trousers-hook may be held in position, so that the fly of a pair of trousers can be tacked down at each side of the hook.

Our invention consists in part in the combination, with stitch-forming mechanism and work-holding mechanism, one of said parts being movable relative to the other to produce a barring or tacking stitch, of means carried by said work-holding mechanism for engaging and holding a hook.

Our invention also consists in certain other novel features and details of construction, all of which are described in the following specification and pointed out in the claims affixed hereto.

Figure 1:
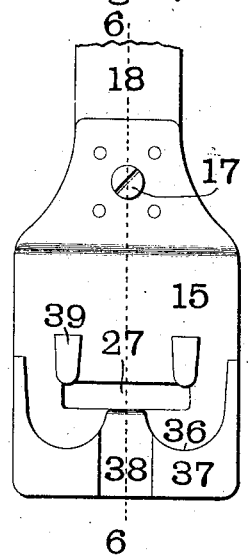
Figure 2:
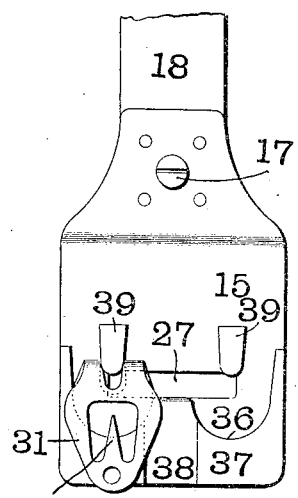
Figure 3:
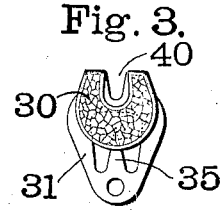
Figure 4:
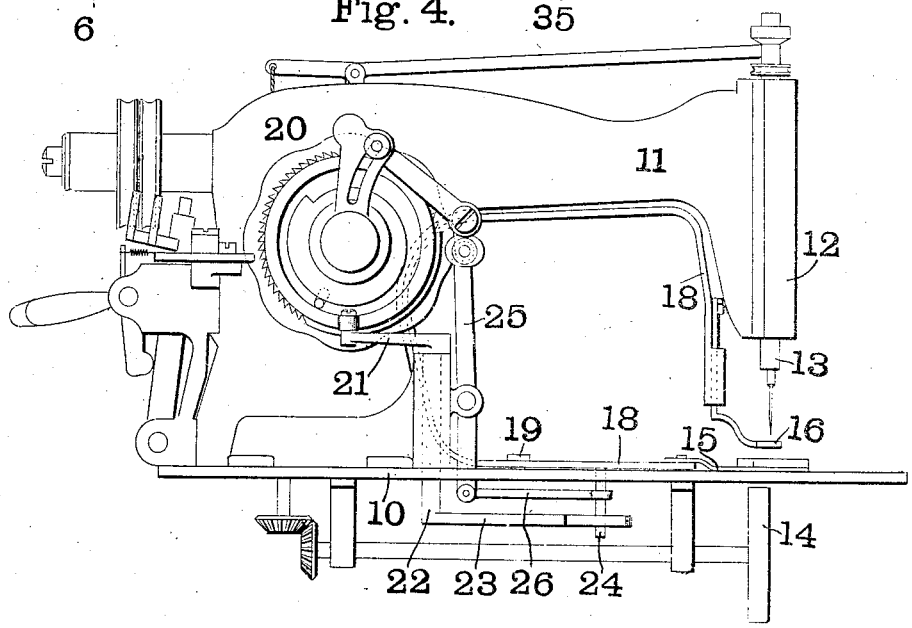

In the accompanying drawings, Figure 1 is a plan view of the work-holding plate. Fig. 2 is a view similar to Fig. 1, but showing a hook in position. Fig. 3 is a detail view of one of the hooks adapted to be used in connection with our machine. Fig. 4 is a side elevation of the complete machine. Fig. 5 is a view similar to Fig. 1, but showing the work held in position by the presser-foot. Fig. 6 is a section on the line 6 6 of Fig. 1. Fig. 7 is a view showing the manner in which the hook is fastened in position. Fig. 8 is a view similar to Fig. 2, but showing a slight modification; and Fig. 9 is a view showing a further modification.

Like marks of reference refer to similar parts in the several views of the drawings.

10 is the base-plate, and 11 the arm, of an ordinary barring or tacking sewing-machine. Carried by the head 12 is a needle-bar 13, which is driven by the usual mechanism and coöperates with the looper 14 to form stitches.

15 is the work-holding plate, which coöperates with a presser-foot 16, formed in two parts capable of independent movement, as shown in the drawings. The work-holding plate 15 is secured at 17 to one end of a casting 18. This casting 18 is pivotally and slidingly mounted to the base-plate 10 at 19, Fig. 4. The double presser-foot 16 is slidingly mounted in the opposite end of the casting 18. In order to impart longitudinal and lateral vibrations to the frame or casting 18, so as to cause the stitch-forming mechanism to form tacking or barring stitches, the machine is provided with a cam mechanism 20. This cam mechanism 20 is connected, by means of an arm 21, shaft 22, and arm 23, to a pin 24, projecting downwardly from the casting 18, and this imparts lateral movement thereto. The longitudinal movement is imparted to the said pin 24 by means of a lever 25 and arm 26. The work-holding plate 15 is provided with an opening 27 for the passage of the needle, and the divided presser-foot 16 is provided with a similar opening 28.

The parts above described are old and well known in the art, and hence we do not claim the same except in combination with parts hereinafter to be described.

30 is the tongue, and 31 the shank, of a trousers-hook, which is adapted to have the said shank secured between the main body 32 and the buttonhole-fly 33 of a pair of trousers, as shown in Fig. 7. In the particular form of hook shown the shank is secured in position by means of a rivet or eyelet 34 passing through the end of the shank and the buttonhole-fly 33. The hook is also provided with a prong 35, which may be bent in to engage the fabric and aid in holding the hook in position. In order to hold the hook in position in the work-holding device of the machine, we provide the plate 15 with a pair of rounded recesses 36, adapted to receive the inner rounded end of the tongue 30 of the hook. These recesses 36 are provided by either securing to or forming integral with the plate 15 a block or plate 37. This block or plate 37 is cut away at 38, so as to form a reduced dividing-strip between the two recesses 36. This reduced portion 38 need only extend a short distance from the opening 27, so as to accommodate the presser-foot 16. For convenience in manufacture, however, we extend it to the end of the plate 15, as shown in the drawings. In order to prevent the hook from rotating in the recesses 36, we provide a pair of detents 39, which are adapted to engage with a notch 40 in the outer end of the hook.

In Fig. 8 we have shown a slight modification for use in connection with a hook which is not provided with the notch 40 in its outer end. In this case the two detents 39 are replaced by two outer detents 41 and an inner detent 42, which detents are adapted to engage with the outer end of the hook, as shown in Fig. 8, to prevent it from rotating.

In the modification shown in Fig. 9 the plate 37 is provided with three recesses 36 instead of two, so that the hook may be held in a central position as well as in the two lateral ones. A third detent 39 is also provided to coöperate with the third recess to hold the hook in a central position to make a tacking or barring stitch in the goods between the sides of the recess 40.

The operation of our machine is as follows: After the shank 31 of the hook has been secured between the body 32 and buttonhole-fly 33 of the pair of trousers the trousers are placed in the machine, as shown in Fig. 5, the rounded inner end of the tongue being engaged by the recess 36 and the notch 40 in the outer end of the hook being engaged by one of the detents 39. This will hold the hook firmly in position, so that it will not be struck by the needle during the operation of tacking the fly to the body of the trousers. The work is held in position in the machine by means of the double presser-foot 16, hereinbefore described. The reduced portion 38 between the two recesses allows the part of the presser-foot which is not over the hook to come down firmly against the goods, and thus hold them in proper position to be operated upon by the needle. The machine is then operated in the usual manner, so as to form a row of barring or tacking stitches 43 at one side of the hook. As soon as this is accomplished the presser-foot is raised and the hook transferred to the other notch, so that a second row of stitches 43 is formed at the other side of the hook. In case the form shown in Fig. 9 is used, a third row of stitches may be made between the sides of the recess 40.

Having fully described our invention, what we claim as new, and desire to secure by Letters Patent of the United States, is—

1. In a sewing-machine, the combination with stitch-forming mechanism and work-holding mechanism, one of said parts being movable relative to the other to produce a tacking or barring stitch, of a presser-foot coöperating with said work-holding mechanism, and means on said work-holding mechanism for engaging and holding the tongue of a hook in one position and then in another and different lateral position.

2. In a sewing-machine, the combination with a stitch-forming mechanism, of work-holding mechanism, one of said parts being movable relative to the other to form a tacking or barring stitch, said work-holding mechanism being provided with a plurality of recesses for engaging the tongue of a hook and a presser-foot coöperating with said work-holding mechanism.

3. In a sewing-machine, the combination with stitch-forming mechanism, of work-holding mechanism, one of said parts being movable relative to the other to produce a tacking or barring stitch, and said work-holding mechanism being provided with a pair of recesses for engaging the tongue of a hook, said recesses being separated by a reduced dividing-strip, and a presser-foot coöperating with said work-holding mechanism.

4. In a sewing-machine, the combination with stitch-forming mechanism and work-holding mechanism, one of said parts being movable relative to the other to produce a tacking or barring stitch, and said work-holding mechanism being provided with a pair of recesses, of a presser for coöperating with said work-holding mechanism, said presser being composed of two parts capable of independent movement.

5. In a sewing-machine, the combination with stitch-forming mechanism and work-holding mechanism, one of said parts being movable relative to the other to produce a tacking or barring stitch, and the parts of said work-holding mechanism between a pair of recesses being reduced, of a presser-foot coöperating with said work-holding mechanism, said presser-foot being composed of two parts capable of independent movement.

6. In a sewing-machine, the combination with stitch-forming mechanism and work-holding mechanism, one of said parts being movable relative to the other to produce a tacking or barring stitch and said work-holding mechanism being provided with a pair of recesses, the part of said work-holding mechanism between said recesses being reduced, of a two-part presser-foot coöperating with said work-holding mechanism.

7. A work-holding plate for tacking or barring sewing-machines, provided with a recess for engaging the inner end of the tongue of the hook, and a detent or detents for engaging the outer end of the hook, and a presser-foot coöperating with said work-holding plate.

8. A work-holding plate for tacking or barring sewing-machines, provided with a plurality of recesses for engaging the inner end of the tongue of the hook, and detents for engaging the outer end of the hook, and a presser-foot coöperating with said work-holding plate.

In testimony whereof we have hereunto set our hands in the presence of the two subscribing witnesses.

JOHN G. LEWIS.
CHAS. W. BAGLEY.

Witnesses:
L. B. BEACH,
D. C. BETJEMAN.